United States Patent [19]

Yonekubo et al.

[11] Patent Number: 4,896,658
[45] Date of Patent: Jan. 30, 1990

[54] HOT WATER SUPPLY SYSTEM

[75] Inventors: Hiroaki Yonekubo, Kyoto; Yasuo Kidouchi, Yamatokoriyama; Yasukiyo Ueda, Nara; Munehiko Tokumoto, Ikoma, all of Japan

[73] Assignee: Matsushita Electric Industrial Co., Ltd., Osaka, Japan

[21] Appl. No.: 202,576

[22] Filed: May 24, 1988

[51] Int. Cl.$^4$ .............................................. F24H 1/00
[52] U.S. Cl. .................................. 126/362; 236/12.12; 126/351; 137/818
[58] Field of Search ................................ 126/351, 362; 236/12.12, 51; 364/502; 137/814, 818, 831; 4/324, 524, 598

[56] References Cited

U.S. PATENT DOCUMENTS 3,091,393  5/1963  Sparrow ..................... 236/12.12 X
3,248,054  4/1966  Weaver ......................... 236/12.12
4,700,884  10/1987  Barrett et al. ................. 126/362 X

FOREIGN PATENT DOCUMENTS

61-18424   2/1986  Japan.
62-255736  11/1987  Japan.
63-14018   1/1988  Japan.

Primary Examiner—Randall L. Green
Attorney, Agent, or Firm—Lowe, Price, LeBlanc, Becker & Shur

[57] ABSTRACT

A hot water supply system includes an arrangement for adjusting a temperature of water. A plurality of outlets are connected to water supplied objects. A change-over valve selects one of the outlets and supplies the water to the selected outlet. An outlet setting unit determines a target outlet selected from the outlets. A temperature setting unit determines a target temperature. A control unit controls the change-over valve and the temperature adjusting means in accordance with the target outlet and the target temperature.

10 Claims, 6 Drawing Sheets

HOT WATER SUPPLY SYSTEM

BACKGROUND OF THE INVENTION

This invention relates to a system for supplying hot or warm water at an adjustable temperature.

Japanese published unexamined utility model application 61-18424 discloses a temperature-adjustable hot water supply system used for only a single task or a few tasks. In this prior art system, during a time interval immediately after hot water is supplied, in the event warm water is required. hot water tends to be supplied initially.

SUMMARY OF THE INVENTION

It is an object of this invention to provide a versatile hot water supply system.

It is another object of this invention to provide a hot water supply system which prevents the supply of hot water when warm water is required during a time immediately after hot water is supplied.

A hot water supply system of this invention includes an arrangement for adjusting water temperature. A plurality of outlets are connected to water supplied objects. A change-over valve selects one of the outlets and supplies the water to the selected outlet. An outlet setting unit determines a target outlet selected from the outlets. A temperature setting unit determines a target temperature. A control unit controls the change-over valve and the temperature adjusting means in accordance with the target outlet and the target temperature.

DESCRIPTION OF THE FIRST PREFERRED EMBODIMENT

Figure 1:
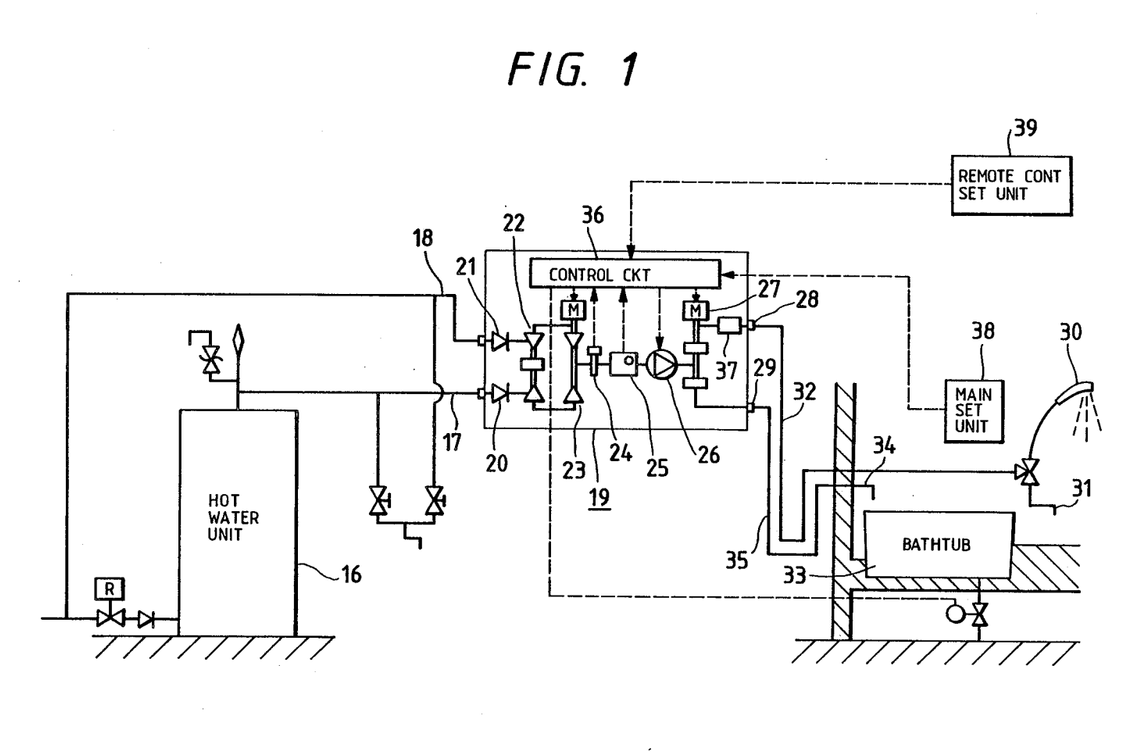
FIG. 1 is a diagram of a hot water supply system according to a first embodiment of this invention.

With reference to FIG. 1, a hot water supply system according to a first embodiment of this invention includes a hot water generating unit or a heater 16 producing hot water. The hot water is transmitted from the hot water generating unit 16 to a mixing unit 19 via hot water piping 17. Cold water is transmitted to the mixing unit 19 via cold water piping 18.

In the mixing unit 19, the incoming hot water travels to a mixing valve 23 via a check valve 20 and a pressure balancing valve 22. The incoming cold water travels to the mixing valve 23 via a check valve 21 and the pressure balancing valve 22. The pressure balancing valve 22 serves to balance the pressure of the hot water and the pressure of the cold water. The mixing valve 23 serves to mix the hot water and the cold water at an adjustable ratio. The mixing valve 23 is preferably of a motor-driven type, being controlled via an electric signal. The ratio between the hot water and the cold water in the resultant water mixture is adjusted in accordance with the electric signal applied to the mixing valve 23. The water mixture moves from the mixing valve 23 to a change-over valve 27 via a thermistor 24, a flow rate sensor 25, and a pressurizing pump 26. The change-over valve 27 selectively directs the water mixture toward a first outlet 28 and a second outlet 29 of the mixing unit 19. The change-over valve 27 has an additional function of continuously varying the flow rate of the water mixture. The change-over valve 27 is preferably of a motor-driven type, being controlled via an electric signal.

The first outlet 28 of the mixing unit 19 is connected to a shower nozzle 30 and a faucet or tap 31 via piping 32. The first outlet 28 of the mixing unit 19 is used in the supply of water having a temperature up to a predetermined limited point, for example, about 45° C., which is significantly lower than the highest temperature. The second outlet 29 of the mixing unit 19 is connected via piping 35 to a nozzle 34 of a bathtub 33. The second outlet of the mixing unit 19 supplies water having a temperature up to the highest point.

The mixing unit 19 also includes a temperature safety valve 37 between the change-over valve 27 and the first outlet 28. In cases where the mixing valve 23, the change-over valve 27, or a control circuit 36 described hereinafter malfunctions, the temperature safety valve 37 prevents the supply of excessively hot water to the shower nozzle 30 and the tap 31. The temperature safety valve 37 is preferably of a mechanical type, having a valve member driven by a temperature-responsive element.

A manually-controllable main setting unit 38 outputs control signals to the control circuit 36 within the mixing unit 19. The first and second outlets 28 and 29 can be changed by operating the main setting unit 38. In addition, the temperature of outgoing water can be varied by operating the main setting unit 38.

A remote control setting unit 39 also outputs control signals to the control circuit 36 within the mixing unit 19. The supply of hot water can be subjected to remote control by operating the remote control setting unit 39. The hot water supply can be started at a predetermined time by operating a timer within the remote control setting unit 39. The remote control setting unit 39 allows the start of the hot water supply to be controlled, for example, by telephone.

Figure 2:
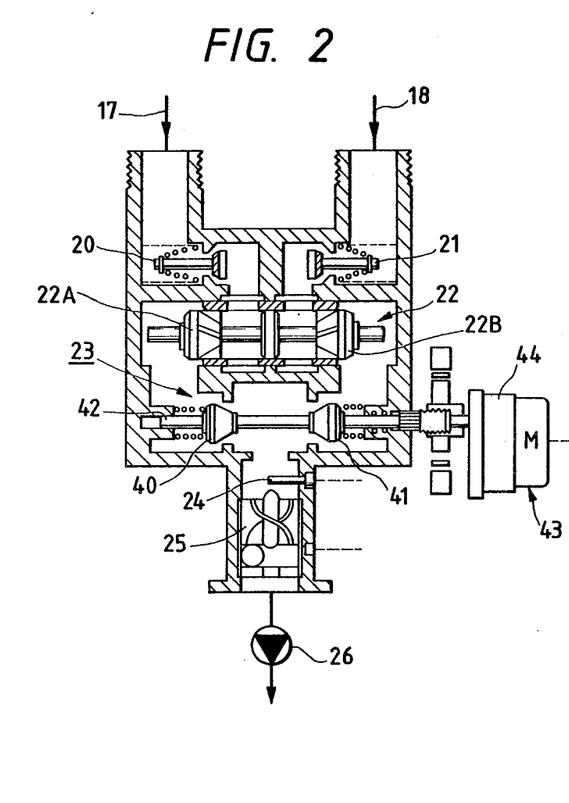
FIG. 2 is a sectional view of a portion of the hot water supply system of FIG. 1 which includes the check valves, the pressure balancing valve, and the mixing valve.

As shown in FIG. 2, the hot water moves from the hot water passage 17 into the pressure balancing valve 22 via the check valve 20. The cold water moves from the cold water passage 18 into the pressure balancing valve 22 via the check valve 21. The pressure balancing valve 22 includes a slidable piston provided with a hot water valve member 22A and a cold water valve member 22B. The valve members 22A and 22B move in accordance with a pressure differential between the hot water and the cold water to balance the pressures of the hot water and the cold water. Twisted blades formed on the valve members 22A and 22B allow the valve members 22A and 22B to be rotated by the flows of the hot water and the cold water. The rotation of the valve members 22A and 22B prevents calcium components in the water from depositing on the valve members 22A and 22B.

After the hot water and the cold water pass through the pressure balancing valve 22, they enter the mixing valve 23 and mix therein to form a mixture of hot and cold water. The mixing ratio between the hot water and the cold water can be controlled via an electric signal applied to the mixing valve 23. The mixing valve 23 includes a hot water valve member 40 and a cold water valve member 41 mounted on a common shaft 42. The mixing ratio between the hot water and the cold water depends on the positions of the valve members 40 and 41. The shaft 42 is coupled to a motor 43 via a gear box 44. The valve members 40 and 41 can be driven by the motor 43. The valve members 40 and 41 taper and oppose each other. The axes of the tapered valve members 40 extend along the directions of the flows of the hot water and the cold water. This arrangement of the valve members 40 and 41 facilitates the mixing of the hot water and the cold water and also allows the mixing ratio between the hot water and the cold water to vary linearly with the displacement of the valve members 40 and 41.

The temperature of the resulting water mixture is monitored via the thermistor 24. A feedback control loop including the control circuit 36 (see FIG. 1) adjusts the motor 43 in accordance with the difference between a target temperature and the monitored temperature of the water mixture so that the actual temperature of the water mixture can be regulated at the target temperature.

The flow rate of the water mixture is detected by the flow rate sensor 25. An output signal from the flow rate sensor 25 is used in flow rate control and flow rate integration control. In addition, the output signal from the flow rate sensor 25 is used to stop the motor 43 when the hot water supply is inactive. As will be made clear hereinafter, this action prevents the supply of excessively hot water upon restart of the hot water supply.

If the motor 43 is energized during suspension of the hot water supply, the following phenomenon could occur. During a time immediately after the hot water supply, when the hot water supply is restarted, water having a temperature higher than a target temperature tends to be supplied initially. This is because the temperature of the thermistor 24 drops naturally after the suspension of the hot water supply, and this drop in the temperature of the thermistor 24 causes the mixing valve 23 to move toward a hotter side upon the restart of the hot water supply.

Figure 3:
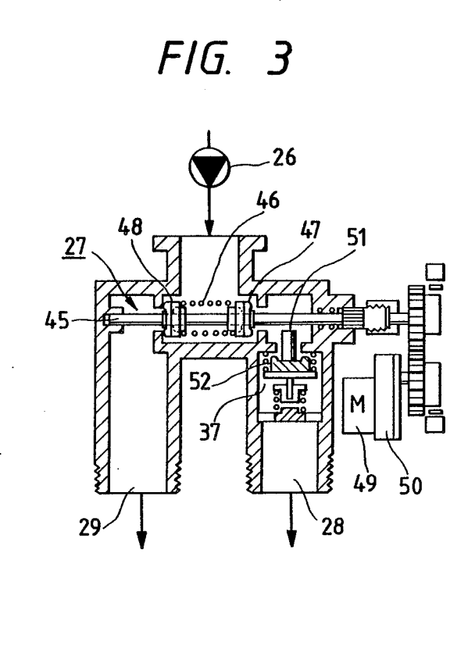
FIG. 3 is a sectional view of another portion of the hot water supply system of FIG. 1 which includes the change-over valve and the temperature safety valve.

As shown in FIG. 3, the water mixture is driven by the pressurizing pump 26 into the change-over valve 27. The change-over valve 27 includes valve members 47 and 48 mounted on a movable shaft 45 and urged apart by a spring 46. The shaft 45 is coupled to a motor 49 via a gear box 50. The valve members 47 and 48 are driven by the motor 49. When the shaft 45 is in its neutral position, the supply of the water mixture to the first and second outlets 28 and 29 is prevented. As the shaft 45 is moved leftward from the neutral position as viewed in FIG. 3, the water mixture is directed toward the first outlet 28 and the flow rate of the water mixture increases. As the shaft 45 is moved rightward from the neutral position as viewed in FIG. 3, the water mixture is directed toward the second outlet 29 and the flow rate of the water mixture increases. The valve members 47 and 48 can slide relative to the shaft 45. An O-ring extends between the valve member 47 and the shaft 45. Another O-ring extends between the valve member 48 and the shaft 45. Outward displacements of the valve members 47 and 48 are limited by stoppers fixed to the shaft 45. The spring 46 urges the valve members 47 and 48 toward the stoppers. The valve members 47 and 48 have respective packings engageable with valve seats. When the shaft 45 is in its neutral position, the packings of the valve members 47 and 48 are in contact with the respective valve seats so that both of water passages toward the outlets 28 and 29 are blocked. When the shaft 45 moves leftward from the neutral position, the packing of the valve member 48 remains in contact with the associated valve seat but the packing of the valve member 47 separates from the associated valve seat so that the water passage toward the outlet 28 is unblocked. When the shaft 45 moves rightward from the neutral position, the packing of the valve member 47 remains in contact with the associated valve seat but the packing of the valve member 48 separates from the associated valve seat so that the water passage toward the outlet 29 is unblocked.

The temperature safety valve 37 includes a temperature responsive element 51 and a valve member 52 connected to the temperature responsive element 51. The temperature responsive element 51 has thermo-wax. The temperature responsive element 51 is disposed within a water passage extending between the change-over valve 27 and the outlet 28 so as to respond to the temperature of water in the passage. When the temperature of the temperature responsive element 51, that is, the temperature of the water in that passage, exceeds a preset point, for example, 46° C., the temperature responsive element 51 expands and thereby moves the valve member 52 into a position where the water passage is blocked.

Figure 4:
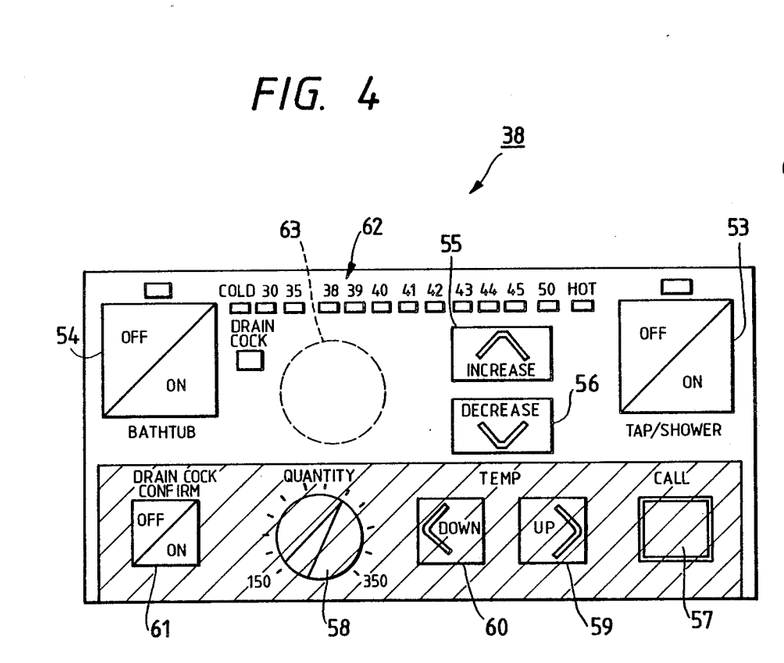
FIG. 4 is a front view of the main setting unit of FIG. 1.

As shown in FIG. 4, the main setting unit 38 includes a tap/shower switch 53, a bathtub switch 54, and flow rate increasing and decreasing switches 55 and 56. Buttons of the respective switches 53–56 are exposed from a front panel of the main setting unit 38. When the tap/shower switch 53 is depressed, the first outlet 28 of the mixing unit 19 is selected via the change-over valve 27 so that the water mixture is supplied to the tap 31 and the shower nozzle 30. When the bathtub switch 54 is depressed, the second outlet 29 of the mixing unit 19 is selected via the change-over valve 27 so that the water mixture is supplied to the bathtub nozzle 34. In both of these cases, the temperature of the supplied water mixture is regulated at a target temperature variably determined via variable resistors. The supply rate of the water mixture is increased by actuating the flow rate increasing switch 55. The supply rate of the water mixture is decreased by actuating the flow rate decreasing switch 56.

The setting unit 38 includes a call switch 57 generating a call when actuated.

A variable resistor 58 has a control knob normally covered by a movable lid attached to the front panel of the main setting unit 38. The variable resistor 58 is used in setting a desired total quantity of supplied water. When the actual quantity of supplied water reaches the desired total quantity, the water supply is automatically suspended.

Temperature up and down switches 59 and 60 have buttons normally covered by the lid on the front panel of the main setting unit 38. The target temperature of the supplied water mixture is increased by actuating the temperature up switch 59. The target temperature of the supplied water mixture is decreased by actuating the temperature down switch 60.

The main setting unit 38 includes a drain cock confirmation switch 61 used in opening and closing a drain cock of the bathtub 33. The switch 61 is also used in receiving a signal from the remote control setting unit 39. The main setting unit 38 further includes a display 62 and a warning buzzer 63.

The target temperature of the supplied water can be varied via the temperature up switch 59 within a range which depends on which of the outlets 28 and 29 is selected via the tap/shower switch 53 and the bathtub switch 54. When the first outlet 28 is selected by depressing the tap/shower switch 53, the target temperature of the supplied water can be varied within a limited range up to 45° C.. When the second outlet 29 is selected by depressing the bathtub switch 54, the target temperature of the supplied water can be varied within a full range up to a maximum temperature.

Figure 5:
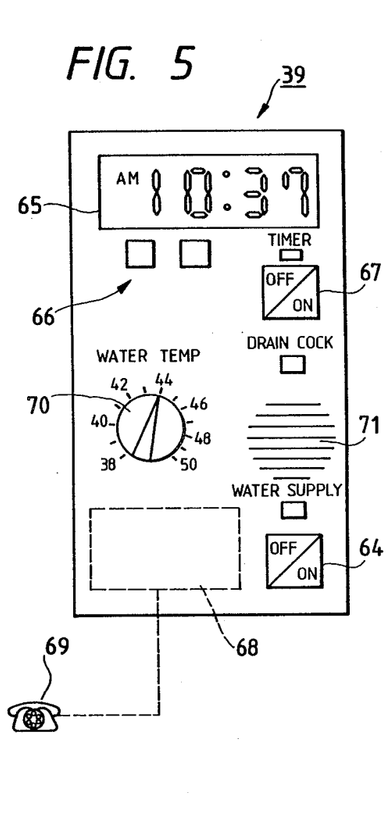
FIG. 5 is a front view of the remote control setting unit of FIG. 1.

As shown in FIG. 5, the remote control setting unit 39 includes a remote control switch 64. In cases where the drain cock confirmation switch 61 (see FIG. 4) is depressed and the water mixture supply via the actuation of the main setting unit 38 is at rest, when the remote control switch 64 is depressed, water mixture supply is performed.

The remote control setting unit 39 includes a combination of an indicator 65, a timer 66, and a timer switch 67. In cases where the drain cock confirmation switch 61 (see FIG. 4) is depressed and the water mixture supply via the actuation of the main setting unit 38 is at rest and where the timer switch 67 is depressed, water mixture supply can be started at a time adjustably determined via the timer 66.

The remote control setting unit 39 is provided with an HA adapter 68 which allows the temperature control water supply to occur via instruction transmitted by a telephone 69, provided that the drain cock confirmation switch 61 (see FIG. 4) is depressed and that the water mixture supply via the actuation of the main setting unit 38 is at rest.

During the mixture water supply via the actuation of the remote control setting unit 39, the temperature of the supplied water mixture is regulated at a target temperature adjustably determined by a variable resistor 70 in the remote control setting unit 39. When the target temperature of the supplied water mixture is moved into a preset higher range by actuation of the variable resistor 70, the second outlet 29 (see FIG. 1) of the mixing unit 19 is automatically selected so that the water mixture is supplied to the bathtub 33.

The remote control setting unit 39 includes a buzzer 71 and various indicators. The buzzer 71 is activated when the call switch 57 (see FIG. 4) is depressed.

Figure 6:
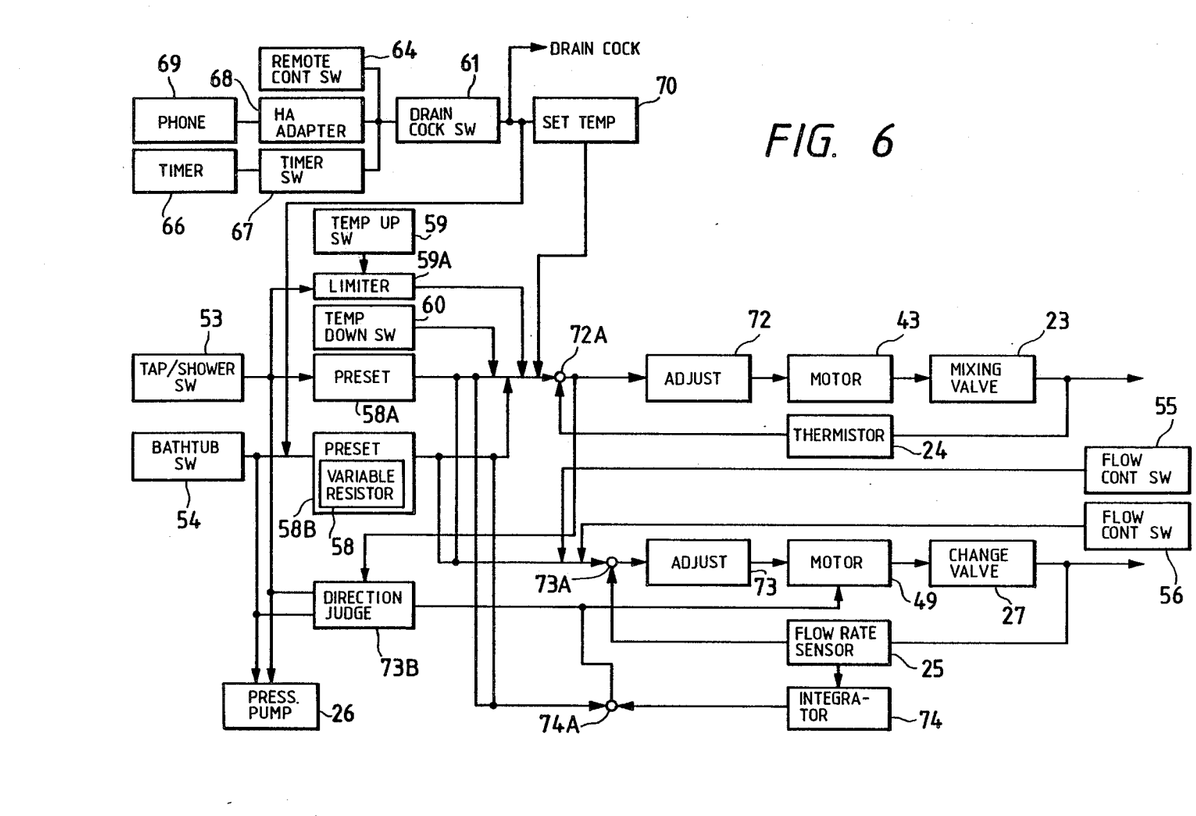
FIG. 6 is a block diagram of the hot water supply system of FIG. 1.

As shown in FIG. 6, the mixing valve 23, the thermistor 24, a subtracter 72A, an adjustment section 72, and the motor 43 form a feedback control loop. The adjustment section 72 may include a servo amplifier or a driver for the motor 43. The subtracter 72A derives a difference between a target water temperature and the actual water temperature detected via the thermistor 24. The mixing valve 23 is controlled via the motor 43 in accordance with the difference between the actual water temperature and the target water temperature so that the actual water temperature can be regulated at the target water temperature. The target water temperature is determined via signals outputted from the previously-mentioned various switches and variable resistors. At the start of the water supply in response to the depression of the tap/shower switch 53, the target water temperature is set to a first predetermined temperature given by a preset section 58A. At the start of the water supply in response to the depression of the bathtub switch 54, the target water temperature is set to a second predetermined temperature given by a preset section 58B and being higher than the first predetermined temperature. During the water supply, the target water temperature can be varied by actuating the temperature control switches 59 and 60. The subtracter 72A is subjected to a signal representative of the target water temperature which depends on the output signals from the temperature control switches 59 and 60. A limiter 59A interposed between the temperature up switch 59 and the subtracter 72A is activated in response to the depression of the tap/shower switch 53. When the tap/shower switch 53 is depressed, the limiter 59A controls the output signal from the temperature up switch 59 so that the target water temperature can be limited to within a preset range significantly lower than the highest temperature. When the bathtub switch 54 is depressed, the limiter 59A is disabled so that the output signal from the temperature up switch 59 travels to the subtracter 72A without undergoing the limiting process. In this case, the target temperature can vary up to the highest temperature. Accordingly, the limiter 59A changes a variable range of the target temperature in accordance with which of the tap/shower switch 53 and the bathtub switch 54 is selected, that is, which of the outlets 28 and 29 (see FIG. 1) of the mixing unit 19 is selected.

The change-over valve 27 selects one of the first and second outlets 28 and 29 of the mixing unit 19 in accordance with an instruction transmitted from the tap/shower switch 53 or the bathtub switch 54 via a direction judgment section 73B and the motor 49. The change-over valve 27, the flow rate sensor 25, a subtracter 73A, an adjustment section 73, and the motor 49 form a feedback control loop. The adjustment section 73 may include a servo amplifier or a driver for the motor 49. The subtracter 73A derives a difference between a target water flow rate and the actual water flow rate detected via the flow rate sensor 25. The change-over valve 27 is controlled via the motor 49 in accordance with the difference between the actual water flow rate and the target water flow rate so that the actual water flow rate can be regulated at the target water flow rate. Upon commencement of the water supply in response to the depression of the tap/shower switch 53, the target water flow rate is set to a first predetermined flow rate given by the preset section 58A. At the start of the water supply in response to the depression of the bathtub switch 54, the target water flow rate is set to a second predetermined flow rate given by the preset section 58B. During water supply, the actual water flow rate can be varied by actuating the flow rate control switches 55 and 56. The flow rate control switches 55 and 56 output control signals which vary a signal representing the target water flow rate and being applied to the subtracter 73A.

A flow rate integrator 74 accumulates the output signal from the flow rate sensor 25 and thereby generates a signal representing the actual quantity of the supplied water. A comparator 74A receives the output signal from the flow rate integrator 74 and a signal representative of a desired total quantity of supplied water which is adjustably determined via the variable resistor 58 (see FIG. 4) within the preset section 58B. When the actual quantity of the supplied water reaches the desired quantity of the supplied water, the comparator 74A outputs a control signal to the motor 49 which allows the change-over valve 27 to suspend further supply of the water mixture.

The tap/shower switch 53 and the bathtub switch 54 are connected to the motor 49 via the judgment section 73B. The judgment section 73B determines a target direction of displacement of the change-over valve 27 in accordance with the output signals from the tap/shower switch 53 and the bathtub switch 54. When the tap/shower switch 53 is depressed, the judgment section 73B drives the motor 49 so that the change-over valve 27 can select the first outlet 28 of the mixing unit 19. When the bathtub switch 54 is depressed, the judgment section 73B drives the motor 49 so that the change-over valve 27 can select the second outlet 29 of the mixing unit 19.

Overall operation of the hot water supply system is as follows. When the tap/shower switch 53 of the main setting unit 38 is depressed, the change-over valve 27 selects the first outlet 28 of the mixing unit 19 so that the water mixture is supplied to the tap 31 and the shower nozzle 30. The temperature and the flow rate of the water mixture are regulated at respective target values preset via the control circuit 36. In the temperature regulation control, the mixing valve 23 adjusts the mixing ratio between the hot water and the cold water so that the actual water mixture temperature detected via the thermistor 24 can be equal to the target water mixture temperature. In the flow rate regulation control, the change-over valve 27 adjusts the flow rate of the supplied water mixture so that the actual flow rate detected via the flow rate sensor 25 can be equal to the target flow rate. The target temperature of supplied water mixture can be varied by actuating the temperature control switches 59 and 60. In cases where the first outlet 28 is selected by depressing the tap/shower switch 53, the target temperature of supplied water mixture is limited to a range below 45° C.. The target flow rate of supplied water mixture can be varied by actuation the flow rate control switches 55 and 56. Re-depression of the tap/shower switch 53 allows the change-over valve 27 to suspend the supply of the water mixture. It is preferable that, when the actual quantity of the supplied water mixture, which is detected by the combination of the flow rate sensor 25 and the flow rate accumulator 74, reaches a setting quantity given via the variable resistor 58, further supply of the water mixture is suspended by moving the change-over valve 27.

When the bathtub switch 54 of the setting unit 38 is depressed, the change-over valve 27 selects the second outlet 29 of the mixing unit 19 so that the water mixture is supplied to the bathtub nozzle 34. The temperature and the flow rate of the water mixture are regulated at respective target values preset via the control circuit 36. In the case of the supply of hot water into the bathtub 33, when the actual quantity of the supplied water mixture, which is detected by the combination of the flow rate sensor 25 and the flow rate accumulator 74, reaches a setting quantity given via the variable resistor 58, further supply of the water mixture is suspended by moving the change-over valve 27.

When an increase in the temperature of water within the bathtub 33 is required, the bathtub switch 54 is depressed and then the temperature increasing switch 59 is actuated so that hottest water is usually supplied into the bathtub 33 via the bathtub nozzle 34.

During or after the supply of hot water into the bathtub 33, when the tap/shower switch 53 is depressed, the mixing valve 22 is moved to a position corresponding to a preset temperature, for example, 42° C., and the change-over valve 27 selects the first outlet 28 of the mixing unit 19 so that the water mixture of the preset temperature starts to be supplied to the tap 31 and the shower nozzle 30.

During a time immediately after very hot water is supplied into the bathtub 33, when warm or appropriately hot water is required to be supplied via the tap 31 and the shower nozzle 30, the change-over valve 27 blocks the second outlet 29 of the mixing unit 19 so that the transfer of excessively hot water from the hot water passage 35 to the tap 31 and the shower nozzle 30 is prevented. In addition, since the change-over valve 27 selects one of the outlets 28 and 29 of the mixing unit 19, very hot water previously supplied the bathtub nozzle 34 is prevented from moving to the tap 31 and the shower nozzle 30. The temperature safety valve 37 prevents the supply of excessively hot water through the first outlet 28 of the mixing unit 19 which could occur in the case of a malfunction of the mixing valve 23, the change-over valve 27, or the control circuit 36. The temperature safety valve 37 is activated at a preset temperature, for example, 46° C..

The temperature safety valve 37 may be replaced by a safety arrangement in which the change-over valve 27 is directly driven by a temperature responsive element that allows excessively hot water to escape from the first outlet 28 of the mixing unit 19 into the second outlet 29 of the mixing unit 19 or another place.

In cases where the tap/shower switch 53 is depressed, when the water mixture temperature detected via the thermistor 24 is lower than a target temperature preset via the control circuit 36, the change-over valve 27 is controlled to disable the first outlet 28 but enable the second outlet 29 of the mixing unit 19. Accordingly, the low temperature water mixture escapes into the bathtub 33 and is prevented from discharging via the tap 31 and the shower nozzle 30. In these cases, after the detected water mixture temperature reaches the target temperature, the change-over valve 27 is moved to allow the supply of water mixture to the tap 31 and the shower nozzle 30.

Since the temperature of supplied water is adjusted via the mixing valve 23, the speed of a variation in the supplied water temperature can be higher than a speed in a known hot water supply system in which the supplied water temperature is adjusted via the control of fuel burning in a hot water supply unit.

The temperature of water supplied via the first outlet 28 of the mixing unit 19 and the temperature of water supplied via the second outlet 29 of the mixing unit 19 reside in respective different ranges. Accordingly, the temperature of supplied water is changed automatically in accordance with which of the first outlet 28 and the second outlet 29 is selected, that is, which of the tap/shower switch 54 and the bathtub switch 54 is depressed. This allows an improved safety and an easy handling of the hot water supply system.

DESCRIPTION OF THE SECOND PREFERRED EMBODIMENT

Figure 7:
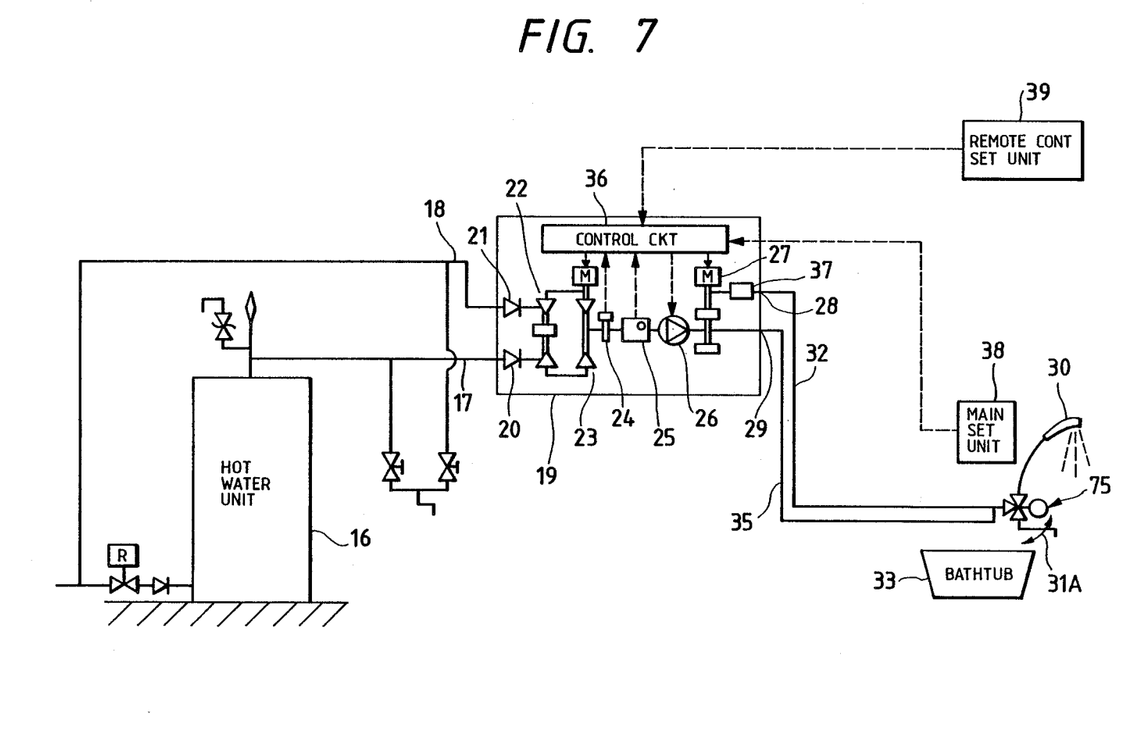
FIG. 7 is a diagram of a hot water supply system according to a second embodiment of this invention.

FIG. 7 shows a second embodiment of this invention which is similar to the embodiment of FIGS. 1–6 except for the following design changes.

As shown in FIG. 7, an end section 75 is provided with a shower nozzle 30 and a rotatable tap 31A. When the tap 31A is moved to a first position, the tap 31A can direct hot water into a bathtub 33. When the tap 31A is moved to a second position, the tap 31A can direct hot water to a region outside the bathtub 33. Passages 32 and 35 extending from outlets 28 and 29 of a mixing unit 19 are connected in common to the end section 75. The passages 32 and 35 meet at a point immediately upstream of the end section 75.

DESCRIPTION OF THE THIRD PREFERRED EMBODIMENT

Figure 8:
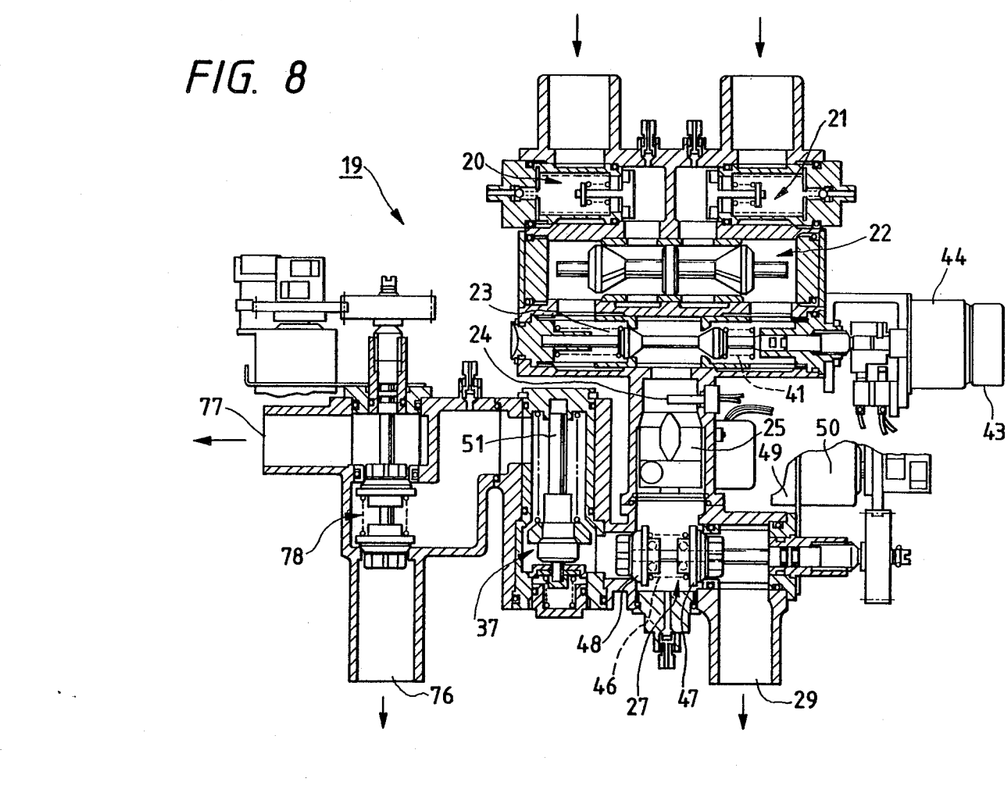
FIG. 8 is a sectional view of a portion of a hot water supply system according to a third embodiment of this invention.

FIG. 8 shows a third embodiment of this invention which is similar to the embodiment of FIGS. 1–6 except for the following design changes.

As shown in FIG. 8, a mixing unit 19 has outlets 76 and 77 which replace the first outlet 28 (see FIGS. 1 and 3). The outlets 76 and 77 are connected to a tap 31 (see FIG. 1) and a shower nozzle 30 (see FIG. 1) respectively. An electrically-controllable change-over valve 78 selects one of the outlets 76 and 77. A combination of a change-over valve 27 and the change-over valve 78 selects one of an outlet 29, and the outlets 76 and 77. Hot water can be supplied via the selected outlet.

What is claimed is:

1. A hot water supply system comprising:
   (a) means for adjusting a temperature of water supplied to the temperature adjusting means from a hot water line and a cold water line, wherein the temperature adjusting means includes a mixing valve mixing hot water and cold water supplied thereto at an adjustable ratio;
   (b) a plurality of outlets receiving water from the temperature adjusting means and connected to water supplied objects;
   (c) a change-over valve means interposed between the temperature adjusting means and the outlets for selecting one of the outlets and supplying the water to a selected target outlet;
   (d) an outlet setting unit means connected to the changeover valve means for determining the target outlet selected from the outlets;
   (e) a temperature setting unit means connected to the mixing valve for determining a target temperature; and
   (f) a control unit means for controlling the change-over valve means and the temperature adjusting means in accordance with the selected target outlet to attain the target temperature, wherein the control unit controls the temperature adjusting means and thereby controls the temperature of water in accordance with which of the outlets is selected by the change-over valve means, wherein the control unit means includes means for predetermining different target temperatures corresponding to the respective target outlets, the target temperatures being in present individual ranges of the temperature of the water, and means for controlling the temperature adjusting means on the basis of the target temperature which corresponds to the selected outlet and which is in the preset individual range of the temperature of the water such that the target temperature at each location of said selected outlet cannot of exceeded by the actual temperature be water supplied to that outlet.

2. The system of claim 1, further comprising a remote control setting unit converted to enable the change-over valve means to select a predetermined one of the outlets and thereby supply water to the selected outlet.

3. The system of claim 1, wherein the outlet setting unit means comprises a number of sections equal to the number of the outlets.

4. The system of claim 1, further comprising an end section connected to the change-over valve means and passages connecting the respective outlets to the end section, the passages meeting at a point upstream of the end section.

5. The system of claim 1, wherein said mixing valve includes a hot water inlet valve and a cold water inlet valve each having a valve axis substantially lying along the direction of inlet flows into the hot and cold water valves to allow the mixing ratio to vary substantially linearly.

6. The system of claim 1, wherein the change-over valve means is operative to adjust a supply rate of the water.

7. The system of claim 6, further comprising means for determining a target supply rate, means for controlling the change-over valve means in accordance with the target supply rate, means for detecting an actual supplied quantity of the water, means for determining a target supplied quantity, and means for suspending a further supply of the water when the actual supplied quantity reaches the target quantity.

8. A hot water supply system comprising:
   (a) means for adjusting a temperature of water supplied to the temperature adjusting means from a hot water line and a cold water line, wherein the temperature adjusting means includes a mixing valve mixing hot water and cold water supplied thereto at an adjustable ratio;
   (b) a plurality of outlets receiving water from the temperature adjusting means and connected to water supplied objects;
   (c) a change-over valve means interposed between the temperature adjusting means and the outlets for selecting one of the outlets and supplying the water to a selected target outlet;
   (d) an outlet setting unit means connected to the change-over valve means for determining the target outlet selected from the outlets;
   (e) a temperature setting unit means connected to the mixing valve for determining a target temperature; and
   (f) a control unit means for controlling the change-over valve means and the temperature adjusting means in accordance with the selected target outlet to attain the target temperature, wherein the control unit controls the temperature adjusting means and thereby controls the temperature of water in accordance with which of the outlets is selected by the change-over valve means;
   further comprising a temperature safety valve means connected to the change-over valve means for preventing a supply of the water via one of the outlets when the temperature of the water exceeds an upper limit of the range of the temperature of the water corresponding to the selected outlet.

9. A hot water supply system comprising:

(a) means for adjusting a temperature of water supplied to the temperature adjusting means from a hot water line and a cold water line, wherein the temperature adjusting means includes a mixing valve mixing hot water and cold water supplied thereto at an adjustable ratio;

(b) a plurality of outlets receiving water from the temperature adjusting means and connected to water supplied objects;

(c) a change-over valve means interposed between the temperature adjusting means and the outlets for selecting one of the outlets and supplying the water to a selected target outlet;

(d) an outlet setting unit means connected to the changeover valve means for determining the target outlet selected from the outlets;

(e) a temperature setting unit means connected to the mixing valve for determining a target temperature; and (f) a control unit means for controlling the change-over valve means and the temperature adjusting means in accordance with the selected target outlet to attain the target temperature, wherein the control unit controls the temperature adjusting means and thereby controls the temperature of water in accordance with which of the outlets is selected by the change-over valve means;

further comprising means for detecting a temperature of the water, means for determining different target temperatures corresponding to the respective outlets, and means for, when the detected temperature appreciably differs for the target temperature corresponding to the selected outlet, forcing the change-over valve means to select another of the outlets, and means for, when the detected temperature becomes substantially equal to the target temperature corresponding to the selected outlet, forcing the change-over valve to select the previously-selected outlet again.

10. A hot water supply system comprising:

(a) means for adjusting a temperature of water supplied to the temperature adjusting means from a hot water line and a cold water line, wherein the temperature adjusting means includes a mixing valve mixing hot water and cold water supplied thereto at an adjustable ratio;

(b) a plurality of outlets receiving water from the temperature adjusting means and connected to water supplied objects;

(c) a change-over valve means interposed between the temperature adjusting means and the outlets for selecting one of the outlets and supplying the water to a selected target outlet;

(d) an outlet setting unit means connected to the changeover valve means for determining the target outlet selected from the outlets;

(e) a temperature setting unit means connected to the mixing valve for determining a target temperature; and (f) a control unit means for controlling the change-over valve means and the temperature adjusting means in accordance with the selected target outlet to attain the target temperature, wherein the control unit controls the temperature adjusting means and thereby controls the temperature of water in accordance with which of the outlets is selected by the change-over valve means;

wherein the mixing valve comprises a valve member and an electric driver driving the valve member, and further comprises means for detecting whether or not a supply of the water is being supplied to the mixing valve, and means for deactivating the electric driver when the supply of the water is not being supplied, and further including water temperature measuring means detecting water temperature in the mixing valve to provide a signal for controlling the mixing valve, said water temperature measuring means being subject to natural cooling when the supply of water through the mixing valve ceases, whereby said deactivation of the electric driver prevents a supply of excessively hot water from being supplied to the mixing valve upon restart of water supply, said supply of excessively hot water tending to be caused by natural cooling of the temperature measuring means which occurs during suspension of hot water supply.

* * * * *